(12) United States Patent
Vigil et al.

(10) Patent No.: US 10,472,001 B2
(45) Date of Patent: Nov. 12, 2019

(54) VEHICLE BODY FRAME INCLUDING STRUCTURAL BULKHEAD WITH ACOUSTIC SPRAY FOAM CONTROL

(71) Applicant: Honda Motor Co., Ltd., Tokyo (JP)

(72) Inventors: Fabian J. Vigil, Columbus, OH (US); Aron K. Madsen, Marysville, OH (US); Shawn W. Campbell, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 15/967,773

(22) Filed: May 1, 2018

(65) Prior Publication Data

US 2018/0244323 A1 Aug. 30, 2018

Related U.S. Application Data

(62) Division of application No. 15/381,580, filed on Dec. 16, 2016, now Pat. No. 9,969,442.

(51) Int. Cl.
*B62D 29/00* (2006.01)
*B62D 25/06* (2006.01)
*B62D 25/02* (2006.01)
*B60R 13/08* (2006.01)

(52) U.S. Cl.
CPC ........ *B62D 29/002* (2013.01); *B60R 13/0815* (2013.01); *B62D 25/02* (2013.01); *B62D 25/06* (2013.01)

(58) Field of Classification Search
CPC .............................. B62D 29/002; B62D 25/06
USPC .............................. 296/187.02, 203.03, 210
See application file for complete search history.

(56) References Cited

U.S. PATENT DOCUMENTS

| | | | |
|---|---|---|---|
| 5,213,391 | A | 5/1993 | Takagi |
| 6,358,584 | B1 | 3/2002 | Czaplicki |
| 6,494,525 | B1 | 12/2002 | Blank |
| 6,866,331 | B2 | 3/2005 | Kropfeld |
| 6,896,320 | B2 | 5/2005 | Kropfeld |
| 6,941,719 | B2 | 9/2005 | Busseuil et al. |
| 7,097,794 | B2 | 8/2006 | McLeod et al. |
| 7,296,847 | B2 | 11/2007 | Czaplicki |
| 7,309,521 | B2 | 12/2007 | Brown |
| 8,911,008 | B1 | 12/2014 | Campbell et al. |
| 8,926,780 | B2 | 1/2015 | Bradley |
| 9,211,664 | B2 | 12/2015 | Sandoz et al. |
| 2002/0033618 | A1 | 3/2002 | Kwon |
| 2004/0119184 | A1 | 6/2004 | Brown et al. |
| 2004/0239148 | A1 | 12/2004 | Ratet |

(Continued)

*Primary Examiner* — Dennis H Pedder
(74) *Attorney, Agent, or Firm* — Rankin, Hill & Clark LLP

(57) ABSTRACT

A vehicle body frame includes a longitudinally extending roof side rail. The roof side rail includes an outer panel, an inner panel fixed to the outer panel to define a cavity therebetween, and a reinforcement panel disposed between and fixedly secured to the outer and inner panels. The reinforcement panel separates the cavity into an inner cavity and an outer cavity. The roof rail has a forward end portion and a rearward end portion. An acoustic spray foam control bulkhead is secured within the cavity at the rearward end portion of the roof side rail. The bulkhead includes a first sidewall and a second sidewall spaced from and opposed to the first sidewall. The first and second sidewalls are configured to at least partially confine within the inner cavity between the first and second sidewalls an acoustic spray foam injected into an injection inlet aperture provided on the inner panel.

18 Claims, 14 Drawing Sheets

(56) References Cited

U.S. PATENT DOCUMENTS

2012/0235442 A1 9/2012 Ezzat et al.
2012/0256445 A1 10/2012 Baccouche

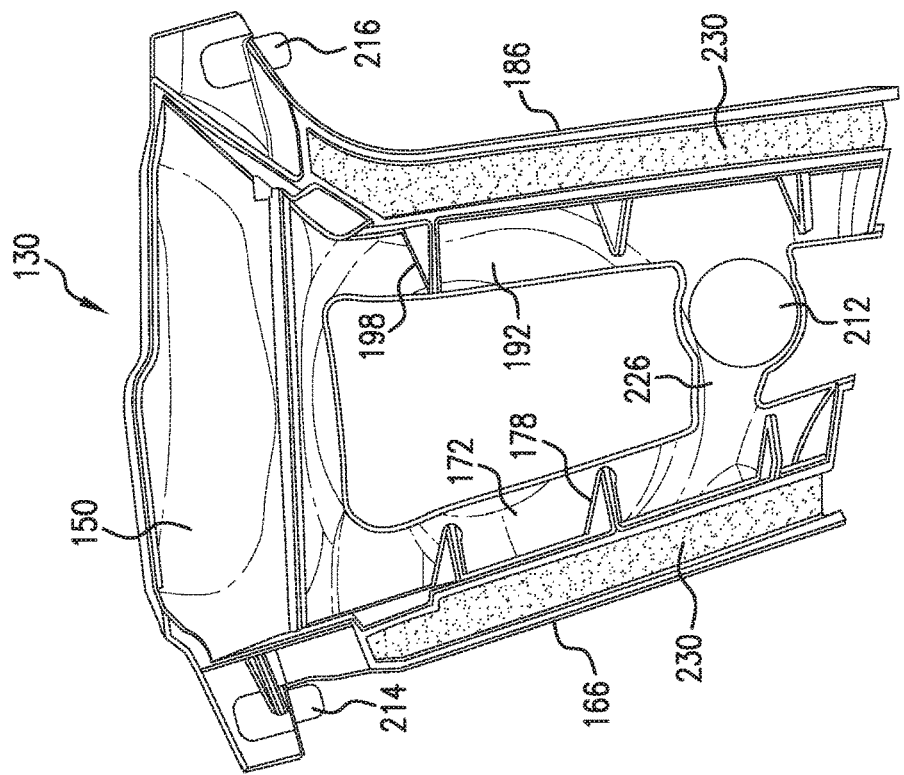
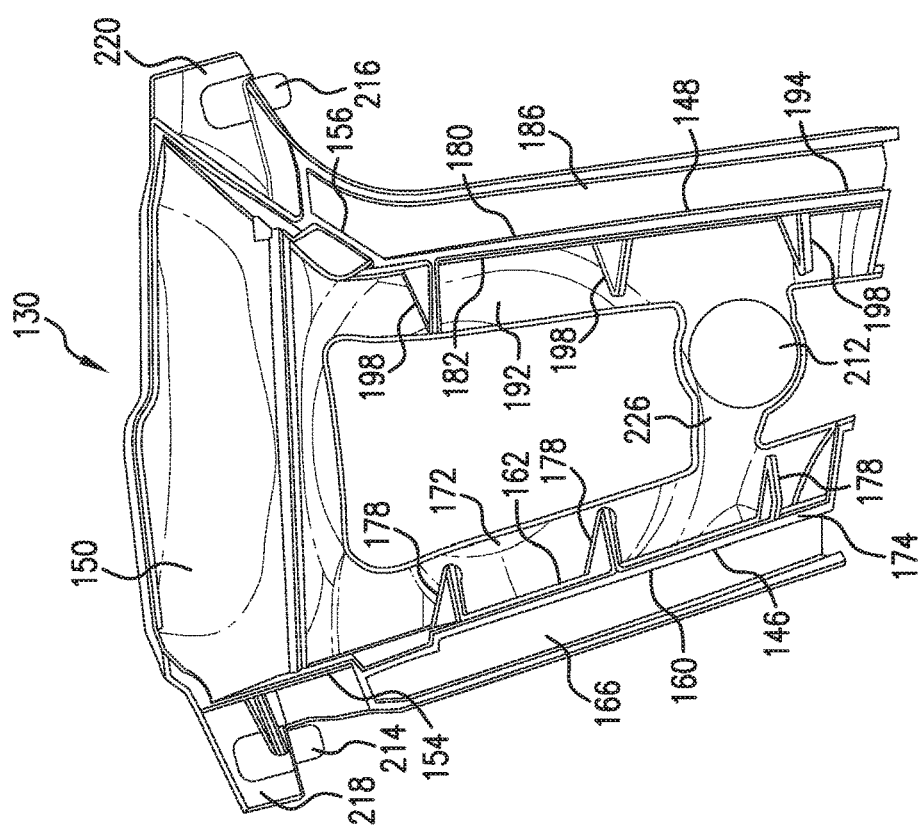

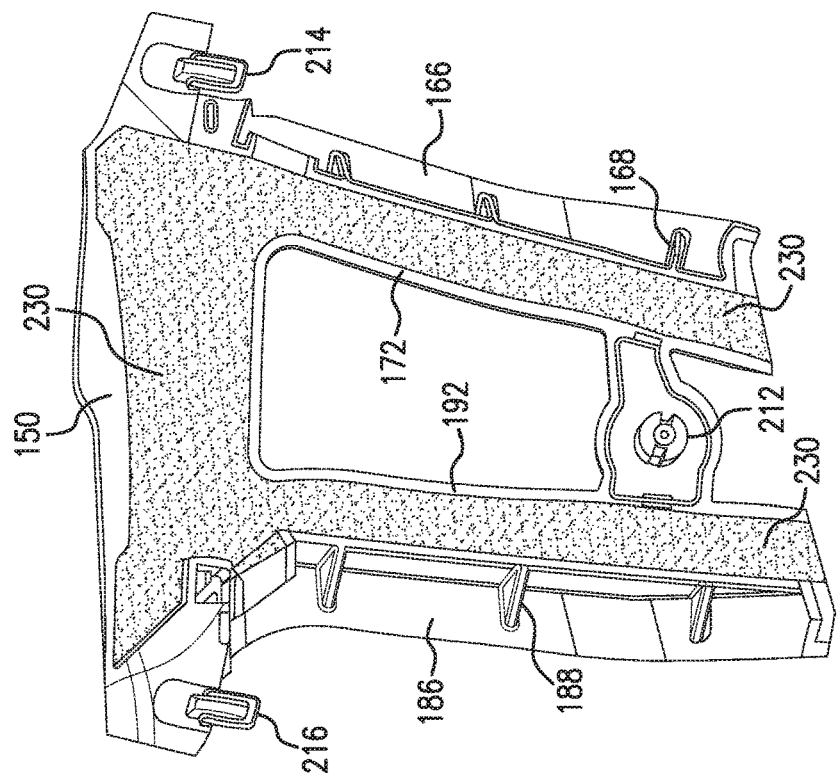
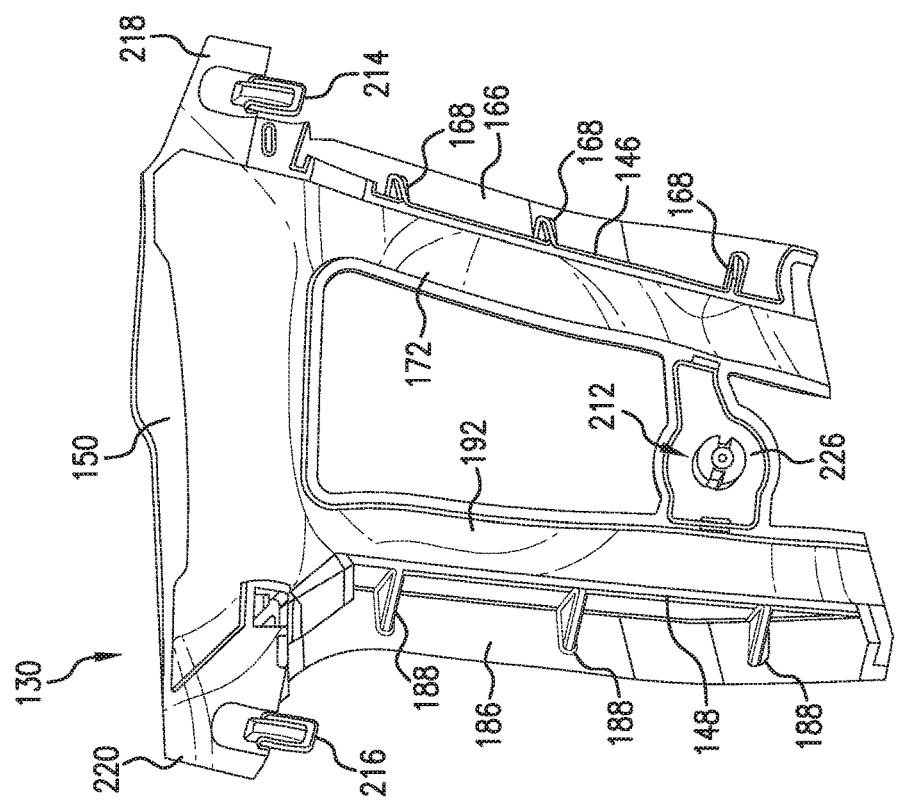

VEHICLE BODY FRAME INCLUDING STRUCTURAL BULKHEAD WITH ACOUSTIC SPRAY FOAM CONTROL

The present application is a divisional of application Ser. No. 15/381,580, filed on Dec. 16, 2016, which is incorporated herein by reference.

BACKGROUND

Acoustic dampening materials are presently used by many vehicle manufacturers to address NVH (noise, vibration and harshness) concerns in vehicles. The dampening material can be a foam installed inside a hollow cavity defined within the vehicle body. Sometimes such foam (e.g., acoustic spray foam) is injected into the hollow cavity within the vehicle body. When injecting the spray foam, many vehicle manufacturers do not attempt to contain the injected foam within the cavity body but rather allow it to be free flowing.

BRIEF DESCRIPTION

In accordance with one aspect, a vehicle body frame comprises a roof side rail extending along a longitudinal direction of the vehicle body frame. The roof side rail includes an outer panel, an inner panel fixed to the outer panel to define a cavity therebetween, and a reinforcement panel disposed between and fixedly secured to the outer and inner panels. The reinforcement panel separates the cavity into an inner cavity and an outer cavity. The roof rail has a forward end portion and a rearward end portion. An acoustic spray foam control bulkhead is secured within the cavity at the rearward end portion of the roof side rail. The bulkhead includes a first sidewall and a second sidewall spaced from and opposed to the first sidewall. The first and second sidewalls are configured to at least partially confine within the inner cavity between the first and second sidewalls an acoustic spray foam injected into an injection inlet aperture provided on the inner panel.

In accordance with another aspect, an acoustic spray foam control method for a roof side rail of a vehicle body frame is provided. The roof side rail includes an outer panel, an inner panel fixed to the outer panel to define a cavity therebetween, and a reinforcement panel disposed between and fixedly secured to the outer and inner panels. The reinforcement panel separates the cavity into an inner cavity and an outer cavity. The method comprises providing an acoustic spray foam control bulkhead configured for mounting within the inner cavity of the roof side rail; injecting an acoustic spray foam through an injection inlet aperture defined in the inner panel and into the inner cavity with the bulkhead controlling the expansion flow of the acoustic spray foam within the inner cavity, wherein the bulkhead includes opposed first and second sidewalls complementary in shape to an inner surface of the roof side rail and flanking the injection inlet aperture; and directing dispersal of the acoustic spray foam through an aperture defined in the reinforcement panel and into the outer cavity.

In accordance with yet another aspect, an acoustic spray foam control bulkhead is positioned within a roof side rail of a vehicle body frame, the roof side rail including a reinforcement panel. The bulkhead comprises a first sidewall and a second sidewall spaced from and opposed to the first sidewall. The first and second sidewalls are configured to inhibit longitudinal dispersal of acoustic spray foam within a cavity defined in the roof side rail. A base wall interconnects the first and second sidewalls. At least one fastener is configured to connect the bulkhead to the roof side rail. A structural adhesive, which is activatable to expand toward surfaces of the roof side rail and the reinforcement panel, fixedly bonds the bulkhead to the surfaces of the roof side rail and the reinforcement panel.

In accordance with yet another aspect, a vehicle body frame comprises a first roof side rail that extends along a longitudinal direction of the vehicle body frame. The roof side rail includes an outer panel, an inner panel fixed to the outer panel to define a cavity therebetween, and a reinforcement panel positioned between the outer and inner panels to separate the cavity into an outer cavity and an inner cavity. The inner panel defines a first aperture for spraying acoustic foam into the cavity. The reinforcement panel defines a second aperture that is in communication with the inner cavity and the outer cavity. A second roof side rail extends along a longitudinal direction of the vehicle body frame. A roof rail extends from the first roof side rail to the second roof side rail. The roof rail is joined to the first roof side rail at a region of the first side rail that partially defines a vehicle door ring.

A bulkhead is positioned in the inner cavity of the first roof side rail at the intersection of the roof rail and the first roof side rail. The bulkhead includes a first sidewall and a second sidewall that extend from the reinforcement panel to the inner panel. The first sidewall is structurally bondable to both the reinforcement panel and the inner panel to reinforce the region of the first roof side rail that intersects the roof rail and partially defines the door ring. The second sidewall is spaced apart from the first sidewall and extends from the reinforcement panel to the inner panel. The second sidewall is structurally bondable to both the reinforcement panel and the inner panel to reinforce the region of the first roof side rail that intersects the roof rail and partially defines the door ring. The first aperture of the inner panel and the second aperture of the reinforcement are positioned along the length of the first roof side rail between the first sidewall and the second sidewall so that acoustic foam sprayed via the first aperture of the inner panel into the inner cavity is confined longitudinally between the first sidewall and the second sidewall and is guided from the inner cavity into the outer cavity via the second aperture of the reinforcement panel.

BRIEF DESCRIPTION OF THE DRAWINGS

FIGS. 4A and 4B are front perspective views of an exemplary bulkhead of the vehicle body frame.

FIGS. 5A and 5B are rear perspective views of the bulkhead.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle body frame disclosed herein are merely terms of art that may vary from one manufacturer to another and should not be deemed to limit the present disclosure.

Figure 1:
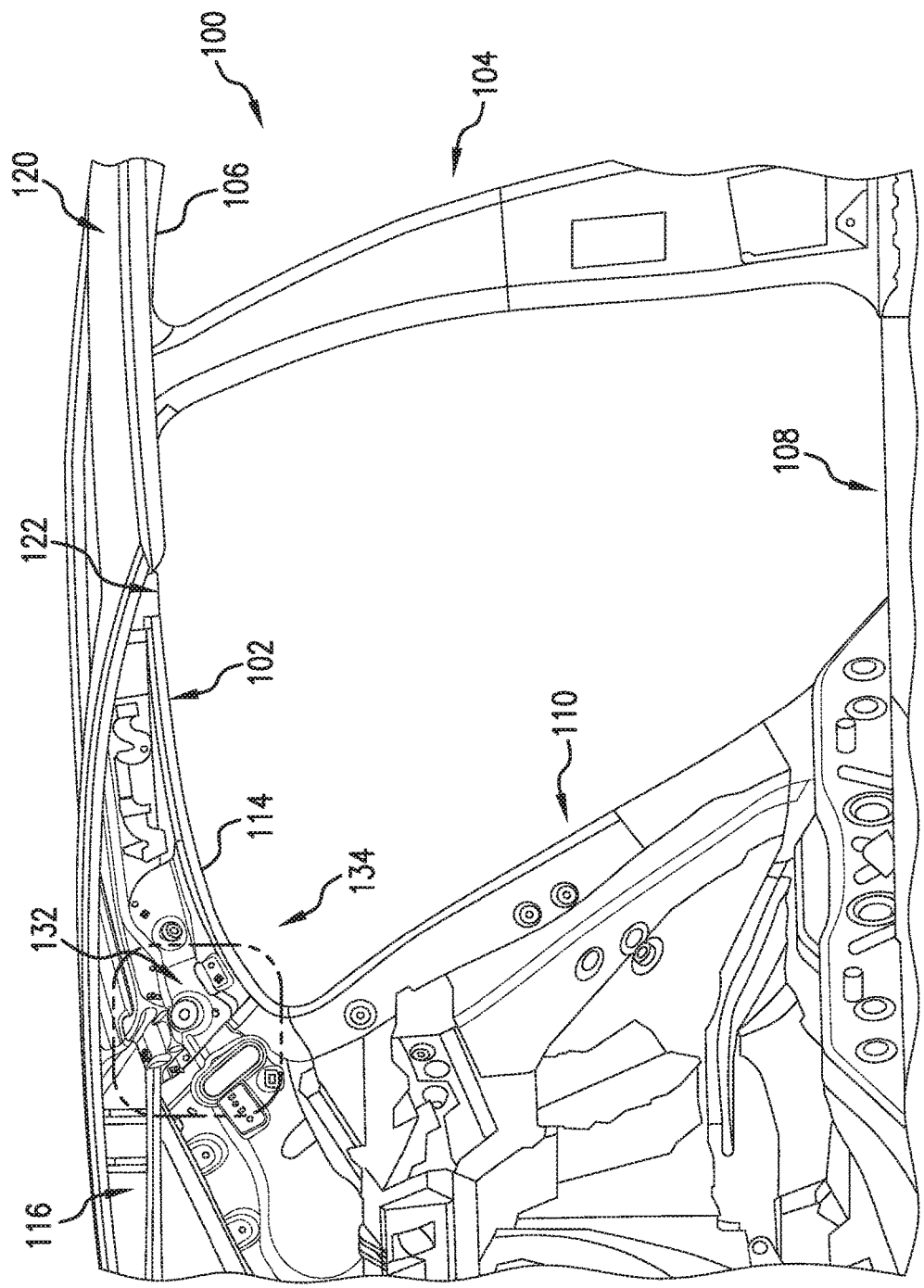
FIG. 1 is a partial side perspective view of an exemplary vehicle body frame including a roof side rail according to the present disclosure.
Figure 2:
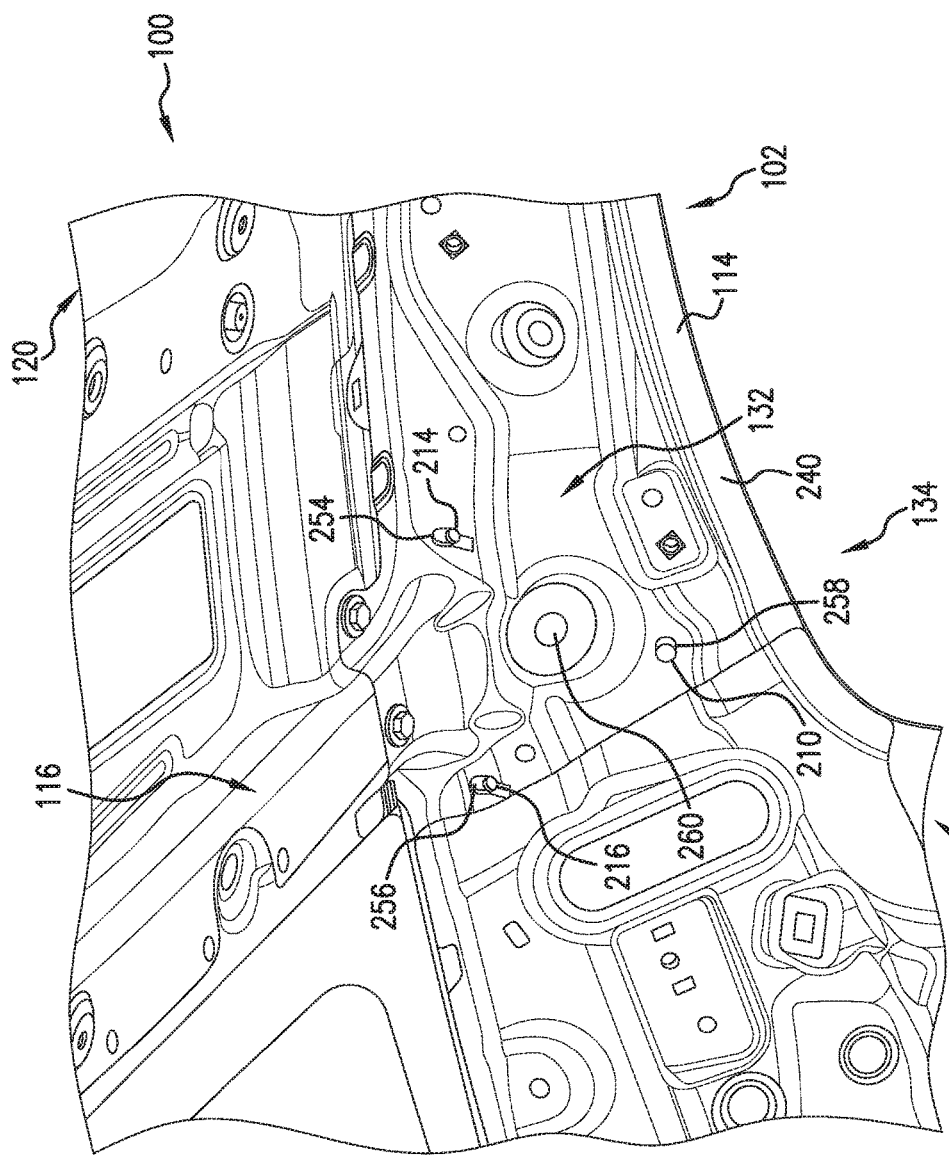
FIG. 2 is an enlarged view of FIG. 1 prior to application of an acoustic spray foam into the roof side rail.
Figure 3:
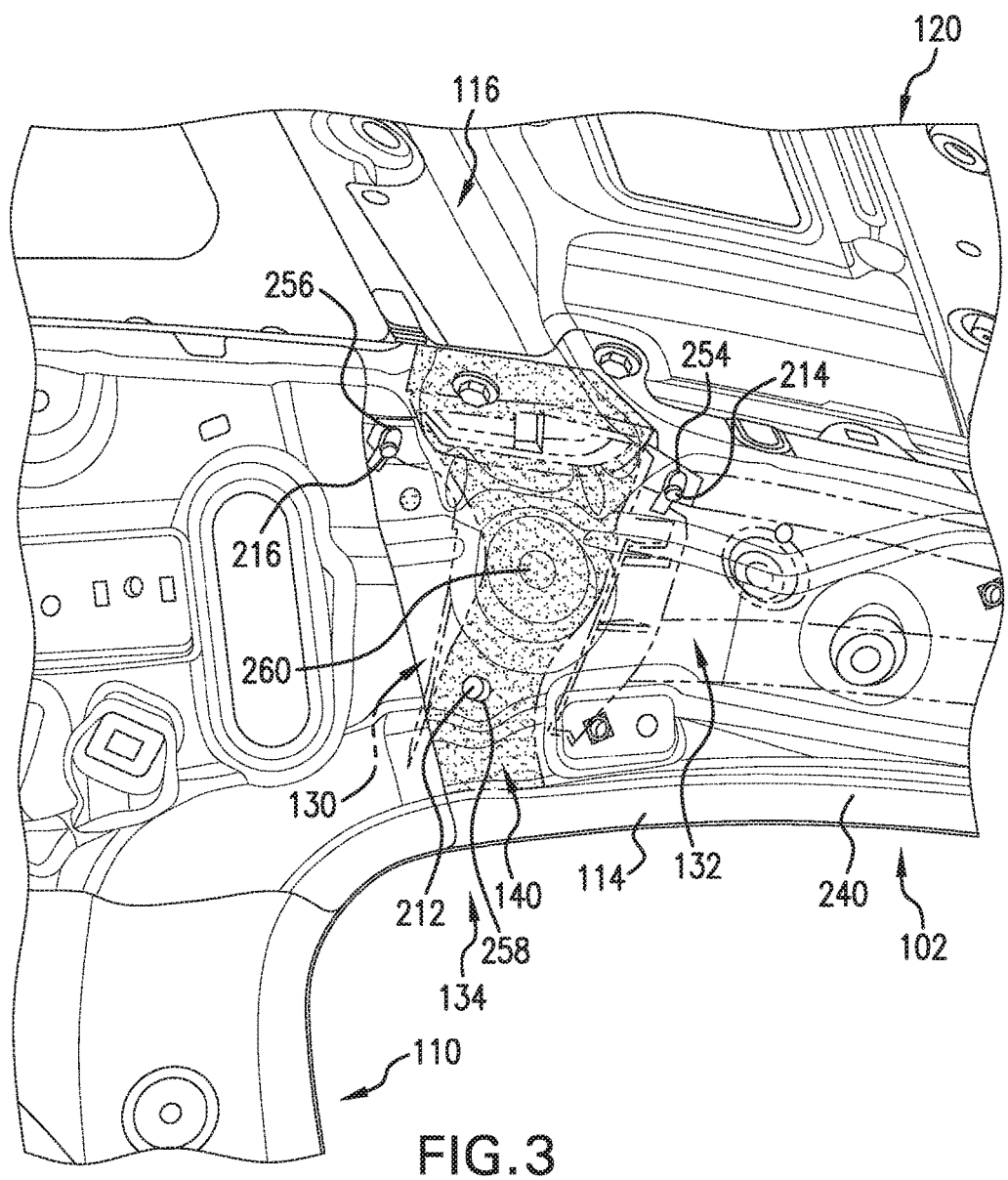
FIG. 3 is an enlarged view of FIG. 1 after application of the acoustic spray foam into the roof side rail.
Figure 6:
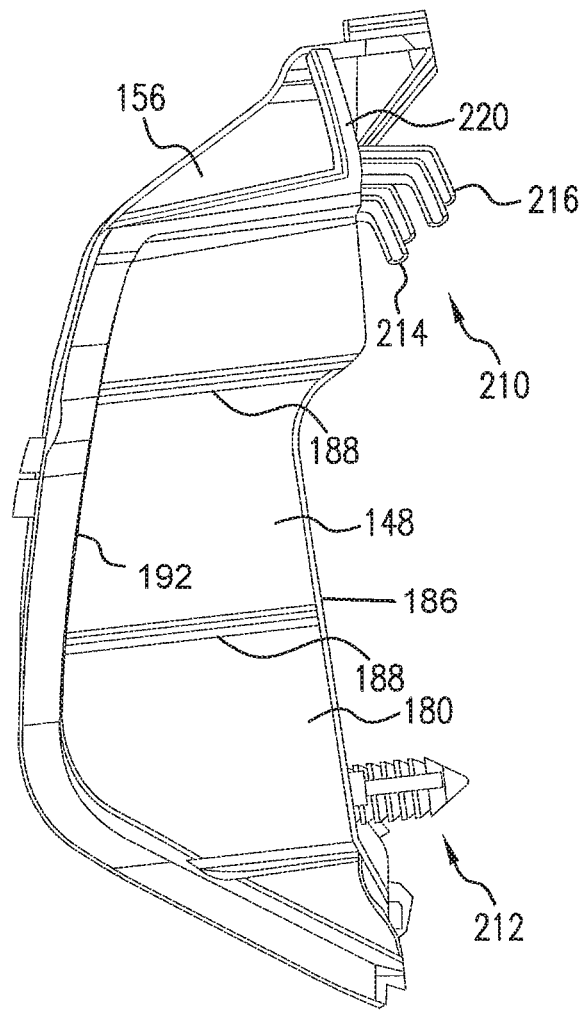
FIGS. 6 and 7 are respective right and left perspective views of the bulkhead.
Figure 7:
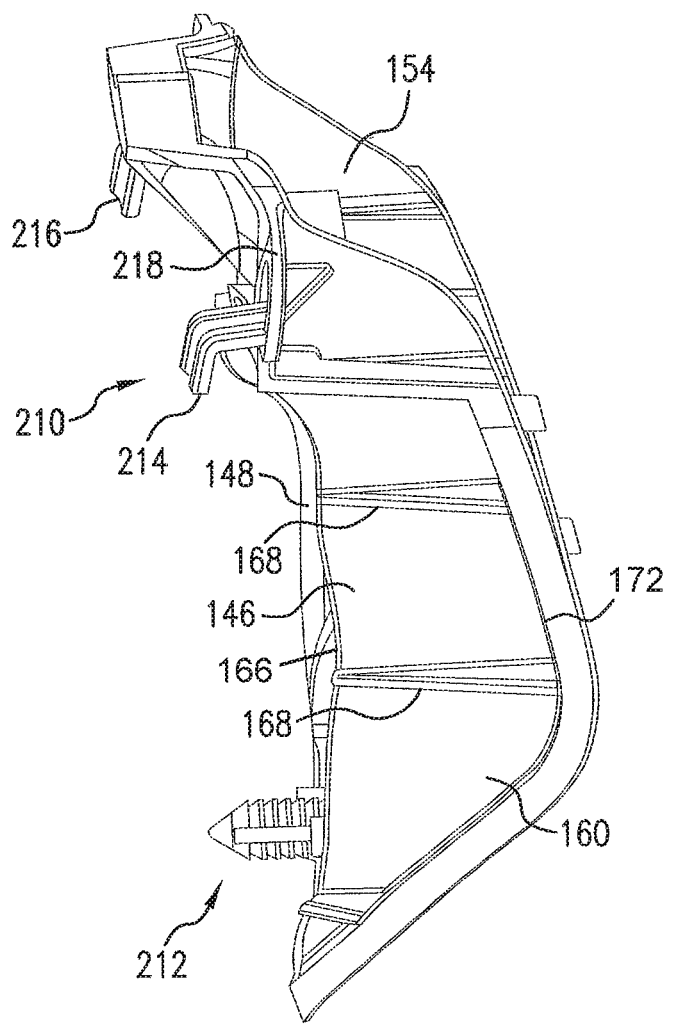
Figure 8:
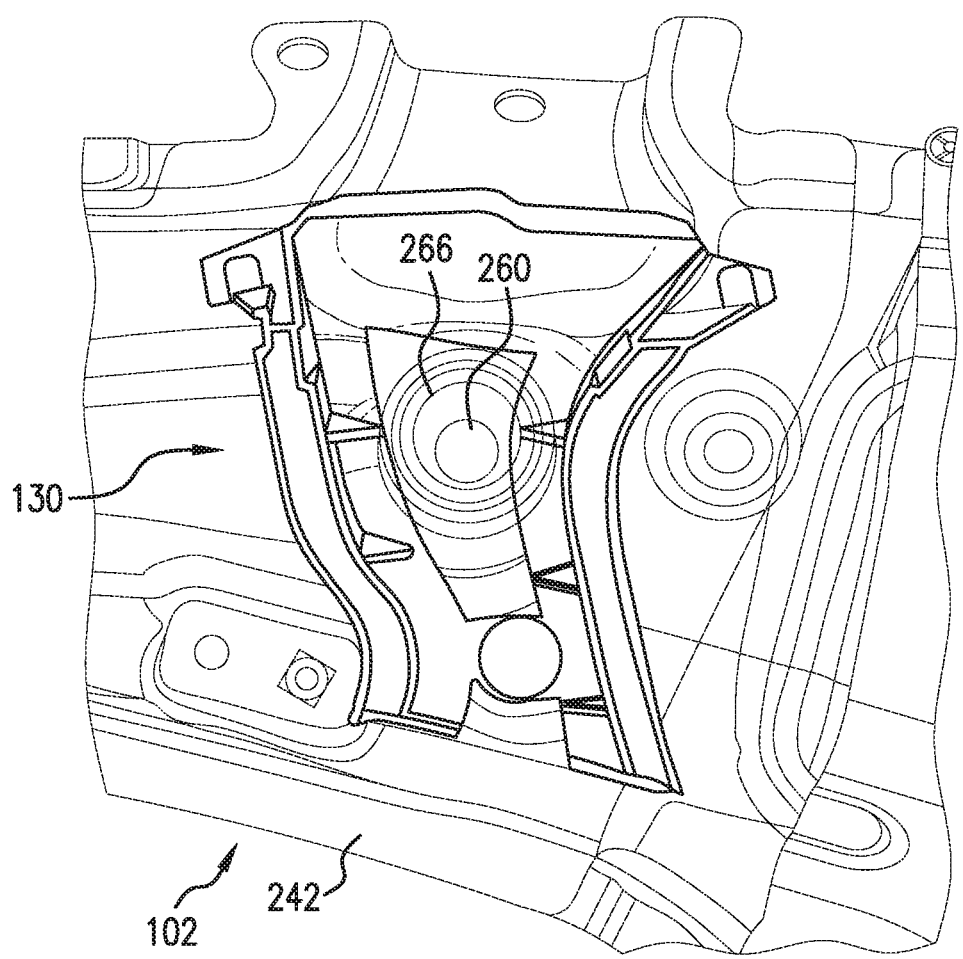
FIG. 8 is an enlarged outside perspective view of the roof side rail having the bulkhead, an outer panel of the roof side rail is transparent.
Figure 9:
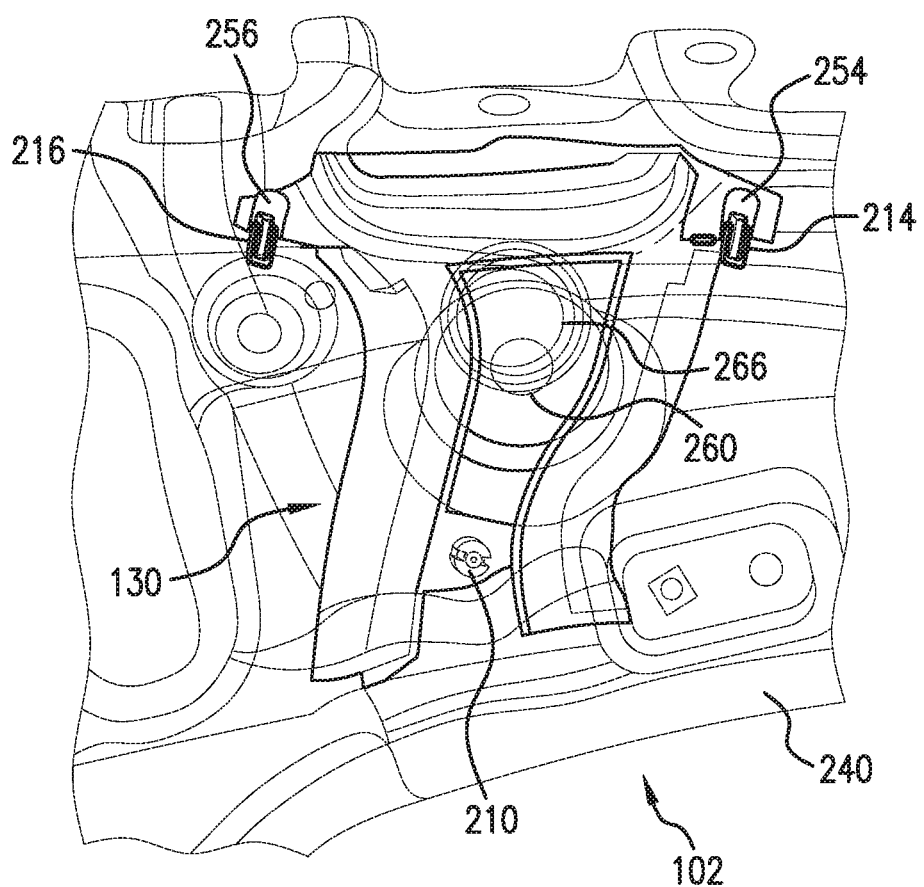
FIG. 9 is an enlarged inside perspective view of the roof side rail having the bulkhead, an inner panel of the roof side rail is transparent.
Figure 10:
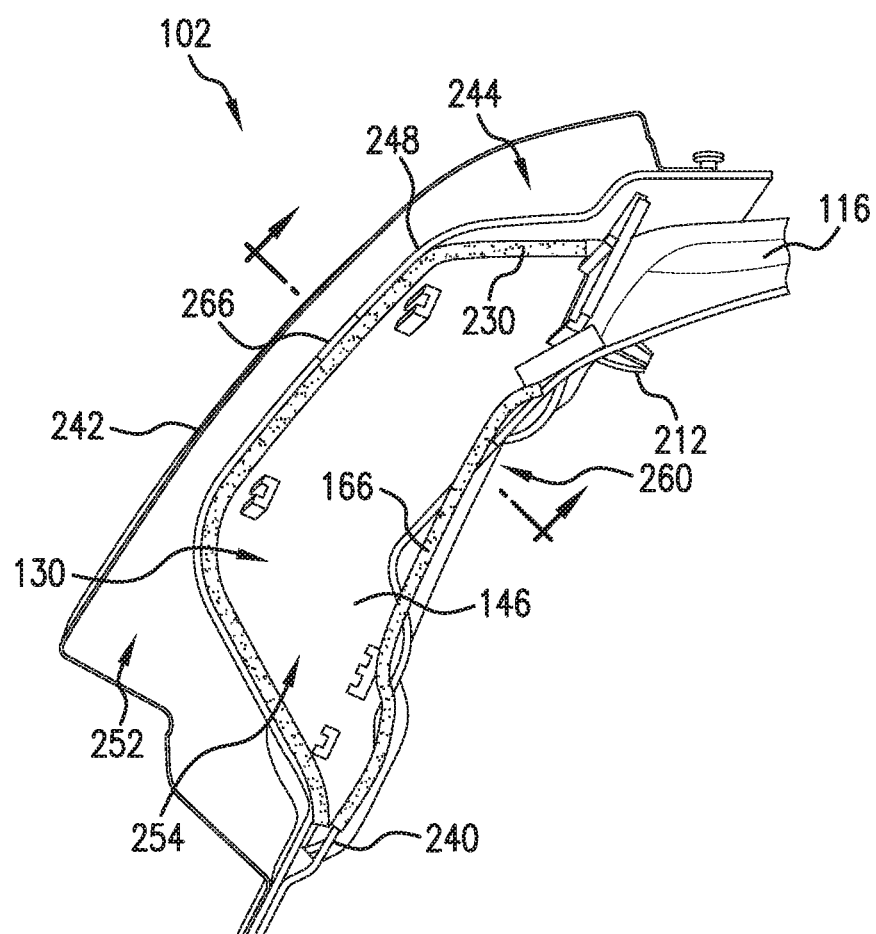
FIG. 10 is a cross-sectional view of the roof side rail together with the bulkhead prior to application of the acoustic spray foam into the roof side rail.
Figure 11:
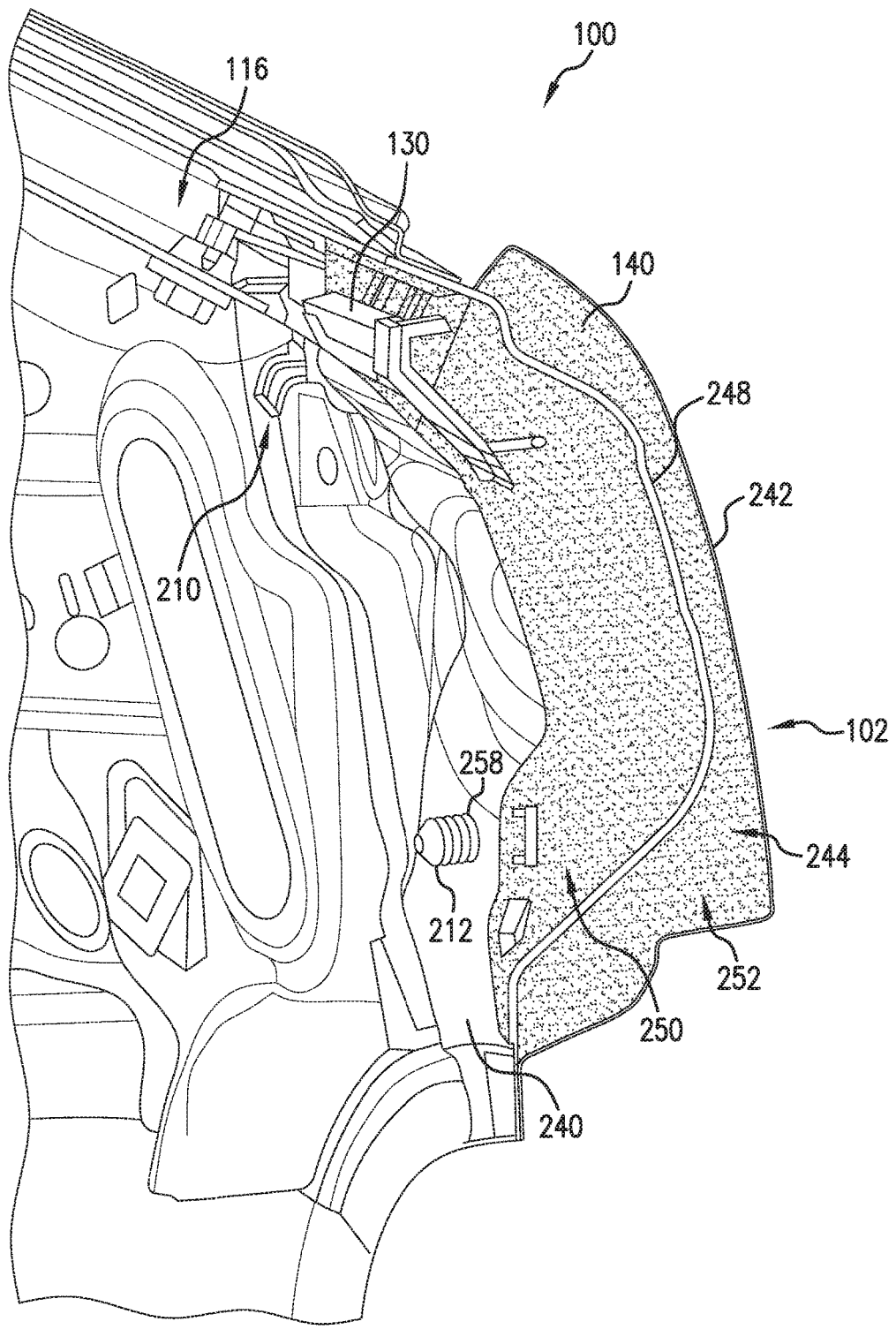
FIGS. 11 and 12 are cross-sectional views of the roof side rail together with the bulkhead after application of the acoustic spray foam into the roof side rail.
Figure 12:
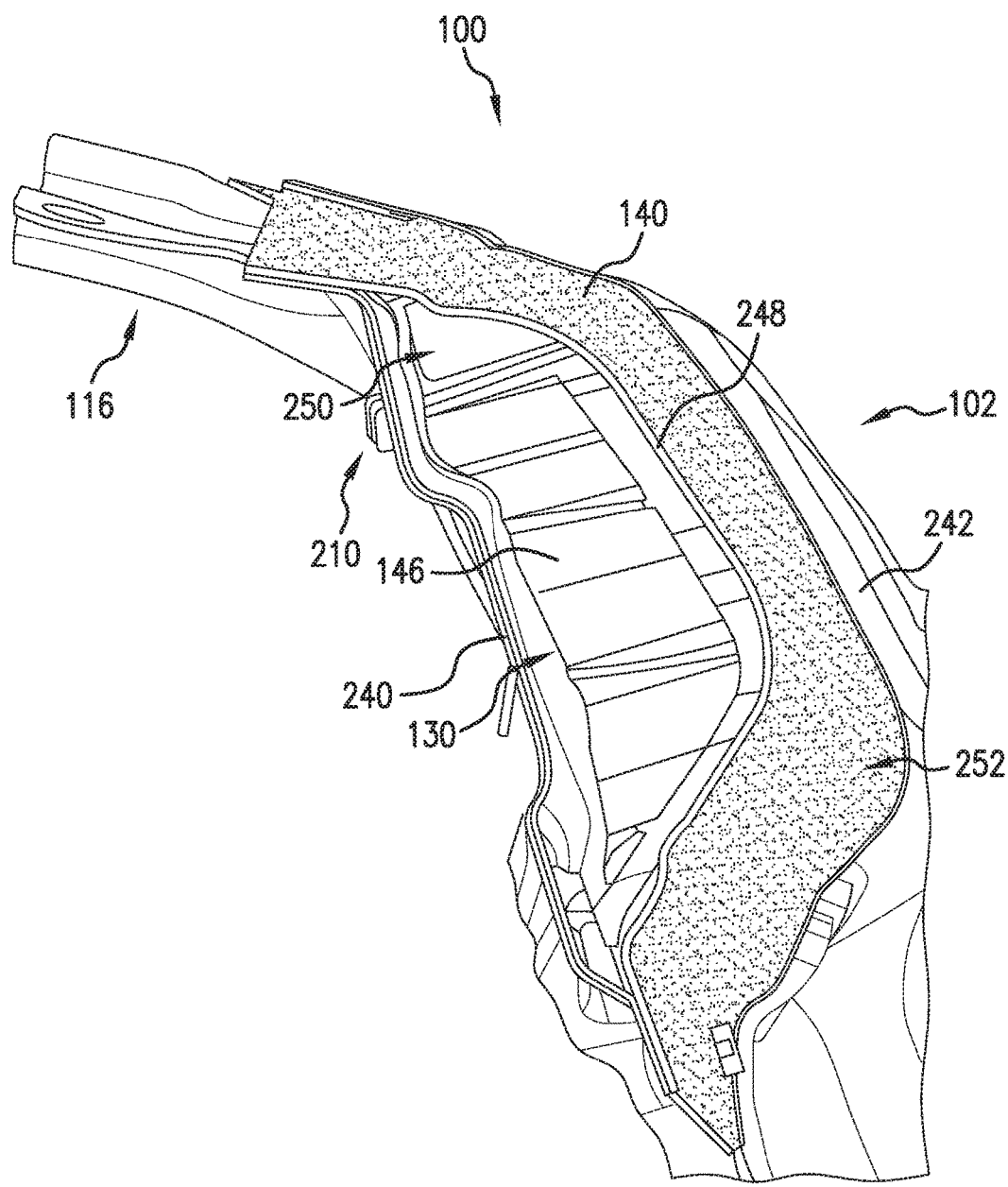
Figure 13:
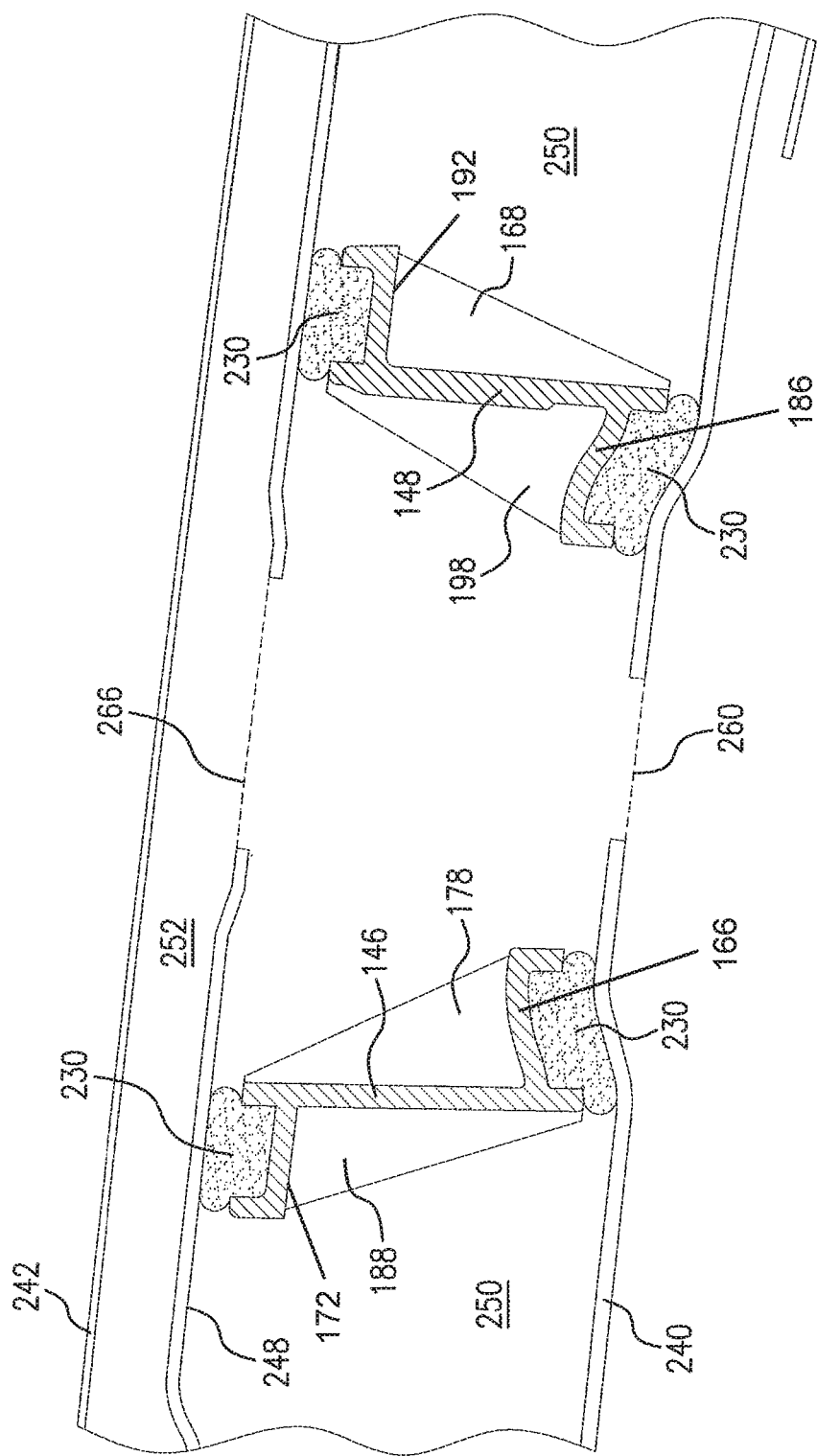
FIG. 13 is a rotated cross-sectional view of the roof side rail together with the bulkhead prior to application of the acoustic spray foam into the roof side rail.

Referring now to the drawings, wherein like numerals refer to like parts throughout the several views, FIGS. 1-3 illustrate a left/passenger side part of an exemplary vehicle body frame 100 according to the present disclosure. The vehicle body frame 100 generally includes a roof side rail 102 extending along a longitudinal direction of the vehicle body frame 100, a first structural pillar (i.e., B-pillar) 104 interconnecting a foreword end portion 106 of the roof side rail 102 and a lower longitudinal frame rail or side sill 108, a second structural pillar (i.e., C-pillar) 110 connected to a rearward end portion 114 of the roof side rail 102, a rear roof rail 116 extending along a widthwise direction of the vehicle body frame 100 and connected to the rearward end portion 114 of the roof side rail 102, and a roof panel 120 connected to the roof side rail 102 and the rear roof rail 116. A vehicle door ring 122 is defined by the roof side rail 102, the structural pillars 104, 110 and the frame rail 108. It should be appreciated that in the longitudinal direction, a right/passenger side part of the vehicle body frame 100 is identically constructed as the right part described above, the right/passenger side part including a roof side rail with the rear roof rail 116 interconnecting the rearward end portions of the roof side rails.

As will be described below, according to the present disclosure an exemplary bulkhead 130 is positioned along the length of the vehicle body frame 100, particularly at a rear roof arch attachment location 132 on the vehicle body frame 100 to provide additional support and stability to a rear roof section 134 (at least partially defined by the roof side rail 102, C-pillar 110 and rear roof rail 116) of the vehicle body frame 100. In addition, the bulkhead 130 serves to guide application of an acoustic spray foam 140 into the roof side rail 102 to, for example, prohibit the acoustic spray foam 140 from intruding into an accessory connection area (i.e., bolt and clip locations) defined on the roof side rail 102 for attaching related vehicle components to the roof side rail 102. The bulkhead 130 may be formed of a variety of materials. Exemplary materials include polymeric materials (e.g., plastics, elastomers, thermoplastics, thermosets, combinations thereof or the like). The materials of the bulkhead 130 may also be reinforced with minerals, fibrous materials (e.g., glass, carbon or nylon fibers), combinations thereof or the like. In another non-limiting example, the bulkhead 130 may be comprised of a metal or metal alloy and welded into place with one or more panels of the roof side rail 102.

The exemplary bulkhead 130 according to one aspect is best shown in FIGS. 4A, 5A, 6, 7, 13, and 14. The bulkhead 130 includes a first sidewall 146, a second sidewall 148 spaced from and opposed to the first sidewall 146, and a base wall 150 interconnecting the first and second sidewalls. Each of the first and second sidewalls 146, 148 are complementary in shape to an inner surface of the roof side rail 102. The base wall 150 can span between end portions 154, 156 of the respective first and second sidewalls 146, 148, and in the depicted embodiment the bulkhead 130 is substantially U-shaped in plan view. The first sidewall 146 includes an outer surface 160 and inner surface 162 (which faces the second sidewall 148) and at least one flange extending outwardly from one of the outer and inner surfaces. As shown, a first flange 166 extends outwardly from the outer surface 160 and along at least a majority of a length of the first sidewall 146. To provide strength and rigidity to the first flange 166, spaced strengthening ribs or gussets 168 are located beneath the first flange 166 at an interface of the first sidewall 146 and first flange 166 (see FIG. 13). A second flange 172 extends outwardly from the inner surface 162 and along at least a majority of the length of the first sidewall 146 (i.e., from an end portion 174 of the first sidewall 146 to the base wall 150). To provide strength and rigidity to the second flange 172, spaced strengthening ribs or gussets 178 are located above the second flange 172 at an interface of the first sidewall 146 and second flange 172.

According to the depicted embodiment, the second sidewall 148 has a construction similar to the first sidewall 146. Particularly, the second sidewall 148 includes an outer surface 180 and inner surface 182 (which faces the first sidewall 146) and at least one flange extending outwardly from one of the outer and inner surfaces. As depicted, a first flange 186 extends outwardly from the outer surface 180 and along at least a majority of a length of the second sidewall 148. To provide strength and rigidity to the first flange 186, spaced strengthening ribs or gussets 188 are located beneath the first flange 186 at an interface of the second sidewall 148 and first flange 186 (see FIG. 13). A second flange 192 extends outwardly from the inner surface 182 and along at least a majority of the length of the second sidewall 148 (i.e., from an end portion 194 of the second sidewall 148 to the base wall 150). To provide strength and rigidity to the second flange 192, spaced strengthening ribs or gussets 198 are located above the second flange 192 at an interface of the second sidewall 148 and second flange 192.

Structural adhesives are used to improve the stiffness of automobiles to, for example, increase vehicle durability and fatigue life. The bulkhead 130 is provided with one or more structural adhesives 230 to structurally bond the bulkhead 130 to the roof side rail 120 to reinforce a region of the roof side rail 102 where bending and vibration loads from the rear roof rail 116 and the C-pillar 110 intersect. Accordingly, the structural adhesive 230 forms part of the load bearing structure of the bulkhead 130. With reference to FIGS. 4B, 5B, 13, and 14, the bulkhead 130 includes the structural adhesive 230 which is activated (e.g., by heat) to expand toward the inner surface of the roof side rail 102 and fixedly secure the bulkhead 130 to the inner surface of the roof side rail 102. According to one aspect, the structural adhesive 230 is adhered to at least one of the flanges of each of the first and second sidewalls 146, 148. According to the depicted aspect of the bulkhead 130, the structural adhesive 230 can be applied to one of the surfaces (e.g., a rear surface in a front view of the bulkhead which faces an inner panel 240) of each of the first flanges 166, 186 of the first and second sidewalls 146, 148. The structural adhesive 230 can be applied to one of the surfaces (e.g., a forward surface in a front view of the bulkhead which faces a reinforcement panel 248) of each of the second flanges 172, 192 of the first and second sidewalls 146, 148. Further, the structural adhesive 230 can be applied to one or both of the surfaces (e.g., a forward surface in a front view of the bulkhead which faces the reinforcement panel 248) of the base wall 150 of the bulkhead 130.

Structural adhesives are used to improve the stiffness of automobiles to, for example, increase vehicle durability and fatigue life. The bulkhead 130 is provided with one or more structural adhesives 230 to structurally bond the bulkhead 130 to the roof side rail 120 to reinforce a region of the roof side rail 102 where bending and vibration loads from the rear roof rail 116 and the C-pillar 110 intersect. Accordingly, the structural adhesive 230 forms part of the load bearing structure of the bulkhead 130. With reference to FIGS. 4B, 5B, 13, and 14, the bulkhead 130 includes the structural adhesive 230 which is activated (e.g., by heat) to expand toward the inner surface of the roof side rail 102 and fixedly secure the bulkhead 130 to the inner surface of the roof side rail 102. According to one aspect, the structural adhesive 230 is adhered to at least one of the flanges of each of the first and second sidewalls 146, 148. According to the depicted aspect of the bulkhead 130, the structural adhesive 230 can be applied to one of the surfaces (e.g., a forward surface in a front view of the bulkhead which faces a reinforcement panel 248) of each of the first flanges 166, 186 of the first and second sidewalls 146, 148. The structural adhesive 230 can be applied to one of the surfaces (e.g., a rear surface in a front view of the bulkhead which faces an inner panel 240) of each of the second flanges 172, 192 of the first and second sidewalls 146, 148. Further, the structural adhesive 230 can be applied to one or both of the surfaces (e.g., a rear surface in a front view of the bulkhead) of the base wall 150 of the bulkhead 130.

The structural adhesive 230 of the present disclosure may include, but is not limited to, urethane, epoxy, methyl methacrylate, and acrylic based structural adhesives, and is activated under a desired condition. As used herein, activated or activatable means that the adhesive 230 softens (e.g., melts), cures, expands, foams or a combination thereof upon exposure to a catalytic condition. Thus, according to one embodiment, the adhesive 230 may be a heat-activated and/or epoxy-based resin having foaming characteristics capable of bridging any gaps between the bulkhead 130 and the portion of the roof side rail 102 to which it is to be structurally bonded. Of course, the adhesive 230 may be activated by other conditions or catalysts.

The properties of the structural adhesive 230 may be tailored to accommodate the assembly and coating steps of the vehicle body frame 100. For example, the structural adhesive 230 may be substantially dry to the touch prior to activation to facilitate handling of the bulkhead 130 during assembly of the bulkhead 130 to the roof side rail 102. In addition to, or alternatively, the structural adhesive may be activated to expand toward the inner surface of the roof side rail 102 (and a reinforcement panel 248) when the vehicle body frame 100 is sent through, for example, a paint process and the adhesive is exposed to elevated temperatures. In a non-limiting example, the structural adhesive 230 is activated to expand and cure during baking of the vehicle body frame 100 at about 150° C. to about 230° C. following e-coating or painting of the vehicle body frame 100. It is to be understood that a variety of methods may be used to bond or otherwise secure the structural adhesive 230 to the bulkhead 130. For example, the uncured structural adhesive 230 can be processed at temperatures below its activation temperature so that it may be provided as a melt, such as by extrusion onto the bulkhead 130, it may be injection molded to form components of the structural adhesive 130 that may then be secured to the bulkhead 130, or the bulkhead 130 can be overmolded with the structural adhesive 230.

With reference to FIGS. 8-12, the roof side rail 102 includes an inner panel 240, an outer panel 242 fixed to the outer panel, inner surfaces of the inner and outer panels 240, 242 defining a cavity 244 therebetween. A reinforcement panel 248 is disposed between and fixedly secured to the inner and outer panels 240, 242. The reinforcement panel 248 separates the cavity 244 into an inner cavity 250 and an outer cavity 252 so that inner surfaces of the inner panel 240 and reinforcement panel 248 define the inner cavity 250 and inner surfaces of the outer panel 242 and reinforcement panel 248 define the outer cavity 252. The panels 240, 242, 248 of the roof side rail 102 can be fixedly attached by any mechanical means known in the art, such as but not limited to welding, etc. The bulkhead 130 is complimentarily received in the cavity 244 of the roof side rail 102. More particularly, the bulkhead 130 is complimentarily received in the inner cavity 250 with the first and second sidewalls 146, 148 configured to span between and engage the inner panel 240 and reinforcement panel 248. As shown, each of the first sidewall 146 and second sidewall 148 of the bulkhead 130 extends along substantially the entire inner surfaces of defining the inner cavity 250. According to the depicted aspect, the reinforcement 248 is further secured to the inner panel 240 at the connection locations 270, 272 between panels 240, 242, 248 (see FIG. 10). The retaining members 214, 216 (which together define the first fastener 210) are received in corresponding openings 254, 256 located in the inner panel 240 (see FIGS. 2 and 3). And the second fastener 212 is received in a corresponding opening 258 located in the inner panel 240 (see FIGS. 2 and 3). It should be appreciated that the use of the first and second fasteners 210, 212 attaches the bulkhead 130 in proper position within the cavity 244 of the roof side rail 102 and the structural adhesive 230, when activated, fixedly secures the bulkhead 130 to the inner surface of the roof side rail 102.

Figure 14:
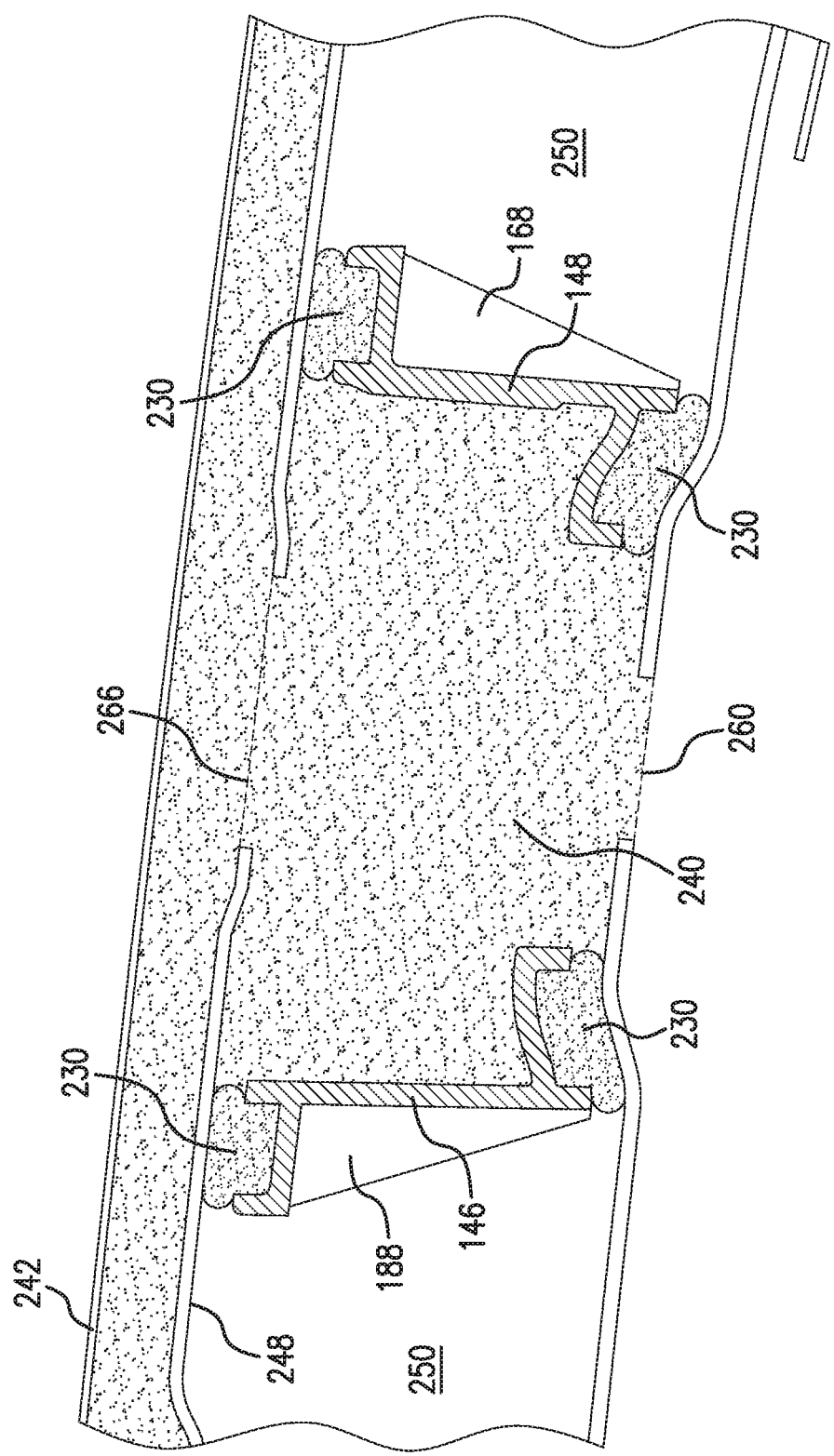
FIG. 14 is a rotated cross-sectional view of the roof side rail together with the bulkhead after application of the acoustic spray foam into the roof side rail.

The inner panel 240 can define an injection inlet aperture 260 into which the acoustic spray foam 140 is sprayed or otherwise injected into the inner cavity 250. As shown, when positioned within the roof side rail 102 the first and second sidewalls 146, 148 flank the injection inlet aperture 260 so that the inlet aperture 260 is positioned along the length of the side rail 102 between the first and second sidewalls 146, 148. Accordingly, the first and second sidewalls 146, 148 confine the acoustic spray foam 140 injected into the injection inlet aperture 260 to the region of the inner cavity 250 positioned between the first and second sidewalls 146, 148, thereby inhibiting longitudinal dispersal of the acoustic spray foam 140 past the first and second sidewalls 146, 148 into the accessory connection area defined in the roof side rail 102. The bulkhead 130 is further configured such that injection of the acoustic spray foam 140 into the injection inlet aperture 260 results in the acoustic spray foam 140 being received in the outer cavity 252. To facilitate such a result, as shown in FIG. 14, the reinforcement panel 248 includes an aperture 266 which is generally aligned with the injection inlet aperture 260. The first and second sidewalls 146, 148 also flank the reinforcement panel aperture 266 so that the aperture 266 is positioned along the length of the side rail 102 between the first and second sidewalls 146, 148. The injection inlet aperture 260 of the inner panel 240 and the aperture 266 of the reinforcement 248 are positioned along the length of the roof side rail 102 between the first sidewall 146 and the second sidewall 148 so that the acoustic spray foam 140 sprayed via the injection inlet aperture 260 into the inner cavity 250 is confined longitudinally between the first sidewall 146 and the second sidewall 148 and is guided from the inner cavity 250 into the outer cavity 252 via the aperture 266 of the reinforcement panel 248. Therefore, the acoustic spray foam 140 passes through the bulkhead 130 unobstructed and into the aperture 266 enabling filling of the outer cavity 252.

Accordingly, the exemplary bulkhead 130 is inserted between the inner panel 240 and the reinforcement panel 248 that itself is positioned between the inner panel 240 and the outer panel 242. As indicated above, each of the first and second sidewalls 146, 148 extends from the reinforcement panel 248 to the inner panel 240 and is structurally bondable to both the reinforcement panel 248 and the inner panel 240 to reinforce the region of the roof side rail 102 that intersects the rear roof rail 116 and partially defines the door ring 122. After insertion, the bulkhead 130 is secured to the inner panel 240 and the expandable structural adhesive 230 that is attached to the bulkhead 130 (e.g., the first and second flanges of the respective first and second sidewalls 146, 146) is activated (e.g., by heat) to structurally bond the bulkhead 130 to the inner panel 240 and the reinforcement panel 248. The bulkhead 130 serves to both contain and guide the later applied acoustic spray foam 140 through the inner cavity 250 between the inner panel 240 and the reinforcement panel 248, and through the aperture 266 in the reinforcement panel 248 and into the outer cavity 252 between the reinforcement panel 248 and the outer panel 242.

In accordance with another aspect of the present disclosure, an acoustic spray foam control method for the roof side rail 102 of the vehicle body frame 100 is provided. The exemplary method comprises providing the acoustic spray foam control bulkhead 130 configured for mounting within the inner cavity 250 of the roof side rail 102; injecting the acoustic spray foam 140 through the injection inlet aperture 260 defined in the inner panel 240 and into the inner cavity 250 with the bulkhead 130 controlling the expansion of the acoustic spray foam 140 within the inner cavity 250. As already described, the bulkhead 130 includes various features to control or contain dispersal of the acoustic spray foam 140 during the injection of the acoustic spray foam 140. In the depicted aspect, the bulkhead 130 includes the opposed first and second sidewalls 146, 148 complementary in shape to the inner surface of the roof side rail 102. The first and second sidewalls 146, 148 flanking the injection inlet aperture 260 and directing/guiding the dispersal of the acoustic spray foam 140 through the aperture 266 defined in the reinforcement panel 248 and into the outer cavity 252.

The exemplary method further comprises containing longitudinal dispersal of the acoustic spray foam 140 when injected into the inner cavity 250 with the first and second sidewalls 146, 148 of the bulkhead 130 to inhibit dispersal of the acoustic spray foam into the accessory connection area defined in the roof side rail 102. Again, inhibiting flow of the acoustic spray foam 140 within the inner cavity 250 of the roof side rail 102 prevents the obstruction of other closely located holes or openings in the inner panel 240 thereby allowing them to function properly, for example, by receiving other suitable fasteners for attachment of related vehicle components to the roof side rail 102. Prior to the acoustic foam injecting operation, the exemplary method includes adhering the bulkhead 130 to the inner panel 240 and reinforcement panel 248, and prior to the adhering step, the exemplary method includes connecting the bulkhead 130 to the inner panel 240. As described above, connecting the bulkhead 130 to the inner panel 240 can include inserting the retaining members 214, 216 (which define the first fastener 210) into the inner panel openings 254, 256 and inserting the second fastener 212 into the inner panel opening 258.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An acoustic spray foam control bulkhead for positioning within a cavity of a roof side rail of a vehicle body frame, the roof side rail including an outer panel, an inner panel fixed to the outer panel to define a cavity therebetween, and a reinforcement panel disposed between and fixedly secured to the outer and inner panels, the bulkhead comprising:
   a first sidewall and a second sidewall spaced from and opposed to the first sidewall, the first and second sidewalls configured to inhibit longitudinal dispersal of acoustic spray foam within the cavity defined in the roof side rail;
   a base wall interconnecting the first and second sidewalls;
   at least one fastener configured to connect the bulkhead to the roof side rail; and
   a structural adhesive which is activatable to expand toward inner surfaces of the roof side rail and the reinforcement panel and fixedly bonds the bulkhead to the inner surfaces of the roof side rail and the reinforcement panel.

2. The acoustic spray foam control bulkhead of claim 1, wherein the first and second sidewalls are configured to be complementary in shape to the inner surface of the roof side rail.

3. The acoustic spray foam control bulkhead of claim 1, wherein the at least one fastener includes a first fastener provided on the base wall and a second fastener located between the first and second sidewalls.

4. The acoustic spray foam control bulkhead of claim 3, wherein the first fastener has a first configuration and the second fastener has a second configuration that differs from the first configuration.

5. The acoustic spray foam control bulkhead of claim 2, wherein the first and second sidewalls are configured to be complementary in shape to the inner surface the reinforcement panel, the first and second sidewalls are configured to span between and engage the inner surfaces of the inner panel and reinforcement panel, and the base wall is configured to engage the inner surface of the reinforcement panel.

6. The acoustic spray foam control bulkhead of claim 1, wherein each of the first sidewall and second sidewall includes at least one flange extending along a majority of a length of the sidewall, the adhesive adhered to the at least one flange of each of the first and second sidewalls.

7. The acoustic spray foam control bulkhead of claim 6, wherein the adhesive is applied to the base wall of the bulkhead.

8. The acoustic spray foam control bulkhead of claim 6, wherein each of the first sidewall and the second sidewall includes first and second flanges located on opposite surfaces of the first and second sidewalls, the second flanges are configured to be positioned adjacent and structurally bondable to the inner surface of the reinforcement panel and the first flanges are configured to be positioned adjacent and structurally bondable to the inner surface of the inner panel.

9. The acoustic spray foam control bulkhead of claim 8, wherein each of the first flanges includes one or more gussets that extends along each of the respective first and second sidewalls.

10. The acoustic spray foam control bulkhead of claim 9, wherein the second flanges of the first and second sidewalls extend toward one another, and each of the second flanges includes one or more gussets that extends along each of the respective first and second sidewalls.

11. The acoustic spray foam control bulkhead of claim 10, wherein the structural adhesive is positioned on surfaces of the second flanges of the first and the second sidewalls that are configured to be facing the reinforcement panel and surfaces of the first flanges of the first and second sidewalls that are configured to be facing the inner panel, and wherein the structural adhesive is expandable to structurally bond the second flanges to the reinforcement panel and the first flanges to the inner panel.

12. The acoustic spray foam control bulkhead of claim 1, wherein the first and second sidewalls are configured to partition the cavity and at least partially confine within the cavity between the first and second sidewalls the acoustic spray foam.

13. The acoustic spray foam control bulkhead of claim 1, wherein the bulkhead is substantially U-shaped in plan view.

14. An acoustic spray foam control bulkhead for positioning within a cavity of a roof side rail of a vehicle body frame, the roof side rail including an outer panel, an inner panel fixed to the outer panel to define a cavity therebetween, and a reinforcement panel disposed between and fixedly secured to the outer and inner panels, the bulkhead comprising:
 a first sidewall and a second sidewall spaced from and opposed to the first sidewall, the first and second sidewalls configured to inhibit longitudinal dispersal of acoustic spray foam within the cavity defined in the roof side rail;
 a base wall interconnecting the first and second sidewalls;
 at least one fastener configured to connect the bulkhead to the roof side rail; and
 a structural adhesive which is activatable to expand toward inner surfaces of the roof side rail and the reinforcement panel and fixedly bonds the bulkhead to the inner surfaces of the roof side rail and the reinforcement panel,
 wherein the first and second sidewalls are configured to be complementary in shape to the inner surfaces of the roof side rail and the reinforcement panel,
 wherein the first and second sidewalls are configured to span between and engage the inner surfaces of the inner panel and reinforcement panel, and the base wall is configured to engage the inner surface of the reinforcement panel.

15. The acoustic spray foam control bulkhead of claim 14, wherein the at least one fastener includes a first fastener having a first configuration provided on the base wall and a second fastener having a second configuration that differs from the first configuration located between the first and second sidewalls.

16. The acoustic spray foam control bulkhead of claim 14, wherein each of the first and second sidewalls includes at least one flange extending along a majority of a length of the sidewall, the adhesive adhered to the at least one flange of each of the first and second sidewalls.

17. The acoustic spray foam control bulkhead of claim 16, wherein each of the first sidewall and the second sidewall includes first and second flanges located on opposite surfaces of the first and second sidewalls, the second flanges are configured to be positioned adjacent and structurally bondable to the inner surface of the reinforcement panel and the first flanges are configured to be positioned adjacent and structurally bondable to the inner surface of the inner panel.

18. The acoustic spray foam control bulkhead of claim 14, wherein the first and second sidewalls are configured to partition the cavity and at least partially confine within the inner cavity between the first and second sidewalls the acoustic spray foam.

* * * * *